US012659703B2

(12) United States Patent
     Mourad

(10) Patent No.:    US 12,659,703 B2
(45) Date of Patent:       Jun. 16, 2026

(54) WIRELESS COMMUNICATION DEVICES, CORRESPONDING METHODS AND COMPUTER PROGRAMS, MOBILE DEVICE AND VEHICLE

(71) Applicant: Bayerische Motoren Werke Aktiengesellschaft, Munich (DE)

(72) Inventor: Alaa Mourad, Munich (DE)

(73) Assignee: Bayerische Motoren Werke Aktiengesellschaft, Munich (DE)

( * ) Notice:    Subject to any disclaimer, the term of this patent is extended or adjusted under 35 U.S.C. 154(b) by 971 days.

(21) Appl. No.:    17/630,833

(22) PCT Filed:    Jun. 23, 2020

(86) PCT No.:    PCT/EP2020/067391
     § 371 (c)(1),
     (2) Date:    Jan. 27, 2022

(87) PCT Pub. No.:    WO2021/052643
     PCT Pub. Date: Mar. 25, 2021

(65)            Prior Publication Data
     US 2022/0279324 A1      Sep. 1, 2022

(30)        Foreign Application Priority Data

Sep. 20, 2019    (EP) ..................................... 19198582

(51) Int. Cl.
     *H04W 4/23*        (2018.01)
     *H04L 1/20*        (2006.01)
                  (Continued)
(52) U.S. Cl.
     CPC .............. *H04W 4/23* (2018.02); *H04L 1/203* (2013.01); *H04W 4/80* (2018.02); *H04W 76/10* (2018.02)

(58) Field of Classification Search
     CPC ......... H04W 4/23; H04W 4/80; H04W 76/10; H04L 1/203
                  (Continued)

(56)              References Cited

U.S. PATENT DOCUMENTS 9,661,523 B1     5/2017  Tamhane et al.
     2017/0230810 A1*  8/2017  Banerjea ................. H04W 4/80
                  (Continued)

FOREIGN PATENT DOCUMENTS

CN        106792431 A     5/2017
     KR       20110062840 A     6/2011
     KR        101677036 B1    11/2016

OTHER PUBLICATIONS

International Search Report corresponding to International Patent Application No. PCT/EP2020/067391, dated Oct. 7, 2020 (2 pages).
                  (Continued)

*Primary Examiner* — Hermon Asres
(74) *Attorney, Agent, or Firm* — Maginot, Moore & Beck LLP

(57)            ABSTRACT

A wireless communication device includes a transceiver module for communicating with a further wireless communication device, and a control module configured to communicate with the further wireless communication device using a first connection. The first connection is based on a long range communication mode of the transceiver module. The control module is configured to receive a short range advertisement packet from the further wireless communication device via the transceiver module, and to control the transceiver module to switch to a short range communication mode of the transceiver module for communicating with the further wireless communication device after receiving the short range advertisement packet. The control module is further configured to communicate with the further wireless
                  (Continued)

communication device using a second connection, which is based on the short range communication mode of the transceiver module.

17 Claims, 3 Drawing Sheets

(51) Int. Cl.
   *H04W 4/80*          (2018.01)
   *H04W 76/10*         (2018.01)
(58) Field of Classification Search
   USPC ........................................................ 370/329
   See application file for complete search history.

(56)                    References Cited

U.S. PATENT DOCUMENTS

2019/0006891 A1*   1/2019   Park ........................ H02J 50/80
2019/0239140 A1*   8/2019   Arickan ................ H04W 40/16

OTHER PUBLICATIONS

Extended European Search Report corresponding to European Patent Application No. EP 19198582.9, dated Jan. 13, 2020 (2 pages).
Chinese Search Report corresponding to Chinese Patent Application No. 202080043921.X, dated Jun. 13, 2024 (10 pages).
English Translation of Chinese Search Report corresponding to Chinese Patent Application No. 202080043921.X, dated Jun. 13, 2024 (11 pages).

* cited by examiner

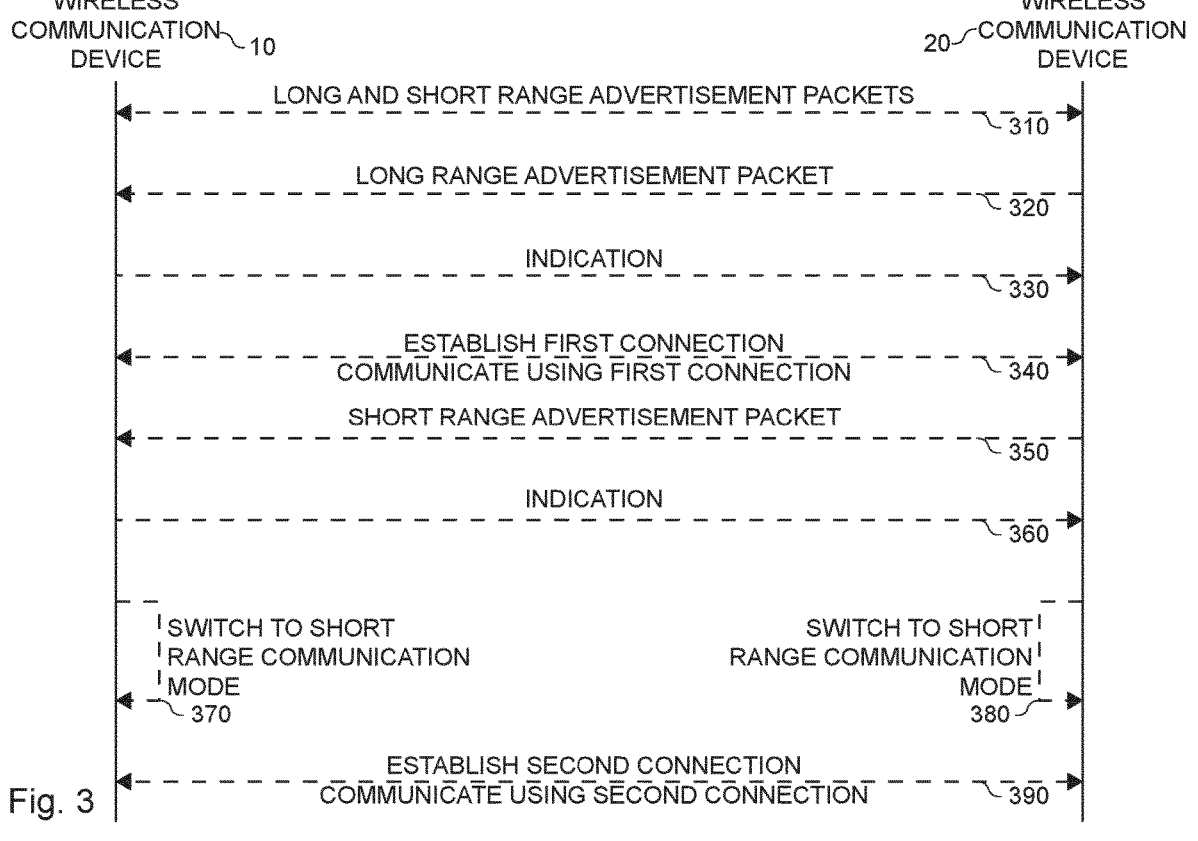

WIRELESS COMMUNICATION DEVICE 10

WIRELESS COMMUNICATION DEVICE 20

LONG AND SHORT RANGE ADVERTISEMENT PACKETS 310

LONG RANGE ADVERTISEMENT PACKET 320

INDICATION 330

ESTABLISH FIRST CONNECTION
COMMUNICATE USING FIRST CONNECTION 340

SHORT RANGE ADVERTISEMENT PACKET 350

INDICATION 360

SWITCH TO SHORT RANGE COMMUNICATION MODE 370

SWITCH TO SHORT RANGE COMMUNICATION MODE 380

ESTABLISH SECOND CONNECTION
COMMUNICATE USING SECOND CONNECTION 390

Fig. 3

WIRELESS COMMUNICATION DEVICES, CORRESPONDING METHODS AND COMPUTER PROGRAMS, MOBILE DEVICE AND VEHICLE

The present application is the U.S. national phase of PCT Application PCT/EP2020/067391 filed on Jun. 23, 2020, which claims priority of European patent application No. 19198582.9 filed on Sep. 20, 2019, which is incorporated herein by reference in its entirety.

FIELD

Embodiments of the present disclosure relate to wireless communication devices and corresponding methods and computer programs, and to a mobile device and a vehicle comprising such wireless communication devices.

BACKGROUND

Wireless communication is a field of research and development. Many different standards exist to cover a broad range of applications. For example, short range communication systems, such as Near Field Communication (NFC) are used for wireless transmissions in close proximity, while other systems, such as WIMAX (Worldwide Interoperability for Microwave Access) are used to provide wireless home broadband access to a large area. Some systems exist that provide different communication modes to cover different ranges, albeit at different transmission rates. For example, in the Bluetooth 5.0 specification, for Bluetooth Low Energy (Bluetooth LE) two short range communication modes are defined that provide 1 Mbit/s or 2 Mbit/s, respectively, over a shorter range, and two long range communication modes that provide 512 kbit/s or 128 kbit/s, respectively, over a longer range. In Bluetooth LE, and other, similar systems, no procedure is provided to switch between these communications modes, so that users are stuck with the lower transmission rates, even when they approach their communication partner.

SUMMARY

There may be a desire to provide an improved concept for wireless communication devices, in which transmission rates are increased, if possible.

Embodiments are based on the finding, that in wireless communication systems, such as Bluetooth LE, long range and short range transmission rates are kept separate, providing no means for dynamically switching between the transmission modes. To mitigate the situations, embodiments rely on different types of advertisement packets being sent for the different communication modes: While communication using the long range communication mode, both wireless communication devices may listen or monitor for short range advertisement packets. As soon as the short range advertisement packets are received at a desired signal strength or bit error rate, the wireless communication devices may switch to the short range communication mode, thereby increasing the supported transmission rate.

Embodiments of the present disclosure provide a wireless communication device that comprises a transceiver module for communicating with a further wireless communication device. The wireless communication device comprises a control module configured to communicate with the further wireless communication device using a first connection. The first connection is based on a long range communication mode of the transceiver module. The control module is configured to receive a short range advertisement packet from the further wireless communication device via the transceiver module. The control module is configured to control the transceiver module to switch to a short range communication mode of the transceiver module for communicating with the further wireless communication device after receiving the short range advertisement packet. The control module is configured to communicate with the further wireless communication device using a second connection. The second connection is based on the short range communication mode of the transceiver module.

By listening for the short range advertisement packet while communicating in the long range communication mode, the wireless communication device may be enabled to determine when the further wireless communication device is close enough to switch to the short range communication mode. By switching to the short range communication mode, the transmission rate may be increased.

For example, the transceiver module may be configured to communicate with the further wireless communication device using a Bluetooth-based communication protocol, e.g. a Bluetooth LE communication protocol. The long range communication mode may be a coded communication mode of the Bluetooth communication protocol. For example, embodiments may be used to switch from the coded communication mode to the uncoded communication mode of the Bluetooth LE standard.

In at least some embodiments, the long range communication mode and the short range communication mode of the transceiver module use the same frequency band. The long range communication mode may use a higher number of symbols for each transmitted bit than the short range communication mode. When the short range and long range communication modes are differentiated by the coding they use, and not by frequency range, receiving both types of advertisement packets is facilitated.

For example, the transceiver module may be configured to use a short range physical layer implementation for the short range communication mode. The transceiver module may be configured to use a long range physical layer implementation for the long range communication mode. The control module may be configured to control the transceiver module to switch to the short range physical layer implementation after receiving the short range advertisement packet. By using distinct physical layer implementations, a power efficiency within the transceiver module may be increased.

In some embodiments, the transceiver module is configured to transmit and/or listen for short range advertisement packets and long range advertisement packets. This may enable a co-use of both the short range and the long range communication mode.

In some cases, a short range communication packet may be received, but the quality of the transmission might not be good enough to switch to the short range communication mode yet. The control module may be configured to control the transceiver module to switch to the short range communication mode of the transceiver module for communicating with the further wireless communication device if a signal strength of the received short range advertisement packet is above a signal strength threshold or if a bit error rate estimated based on the received short range advertisement packet is below a bit error rate threshold. This may avoid situations, in which, due to transmission errors, the transmission rate would be decreased rather than increased by switching.

For example, the control module may be configured to identify the short range advertisement packet as originating from the further wireless communication module based on a device identifier comprised in the short range advertisement packet. The device identifier, such as a Media Access Control address (MAC address) may be used to match the short range advertisement packet to the first communication.

In various embodiments, the control module is configured to establish the second connection via the transceiver module after receiving the short range advertisement packet, thereby indicating successful receipt of the short range advertisement packet to the further wireless communication device. By initiating the second connection after receiving the short range advertisement packet, the connection establishment may be used as acknowledgement for the short range advertisement packet, reducing a communication overhead.

Similar to the establishment of the second connection, the first connection may be established based on an advertisement packet, in this case a long range advertisement packet. The control module may be configured to receive a long range advertisement packet from the further wireless communication device via the transceiver module, and to establish the first connection after receiving the long range advertisement packet from the further wireless communication device.

Embodiments of the present disclosure further provide a second wireless communication device, i.e. the further wireless communication device referenced above, which may be the counterpart to the wireless communication device introduced above. The second wireless communication device comprises a transceiver module for communicating with a further wireless communication device (i.e. the wireless communication device introduced above).

The second wireless communication device comprises a control module configured to communicate with the further wireless communication device using a first connection. The first connection is based on a long range communication mode of the transceiver module. The control module is configured to transmit a short range advertisement packet using a short range communication mode of the transceiver module. The control module is configured to receive an indication that the further wireless communication device has successfully received the short range advertisement packet. The control module is configured to control the transceiver module to switch to a short range communication mode of the transceiver module for communicating with the further wireless communication device after receiving the indication. The control module is configured to communicate with the further wireless communication device using a second connection, the second connection being based on the short range communication mode of the transceiver module. This wireless communication device may be used as a counterpart to the wireless communication device introduced above, enabling the improvement in the transmission rate.

As above, a long range advertisement packet may be used to aid in the establishment of the first connection. The control module may be configured to transmit a long range advertisement packet to the further wireless communication device via the transceiver module. The control module may be configured to establish the first connection after receiving an indication that the further wireless communication device has successfully received the long range advertisement packet.

Embodiments of the present disclosure further provide a mobile device comprising one (or both) of the wireless communication devices. Embodiments of the present disclosure further provide a vehicle comprising one (or both) of the wireless communication devices. Embodiments of the present disclosure further provide a system comprising such a mobile device and a vehicle.

Embodiments of the present disclosure further provide corresponding methods. For example, embodiments provide a method for a wireless communication device. The method comprises communicating with a further wireless communication device via a transceiver module using a first connection. The first connection is based on a long range communication mode of the transceiver module. The method comprises receiving a short range advertisement packet from the further wireless communication device via the transceiver module. The method comprises controlling the transceiver module to switch to a short range communication mode of the transceiver module for communicating with the further wireless communication device after receiving the short range advertisement packet. The method comprises communicating with the further wireless communication device using a second connection. The second connection is based on the short range communication mode of the transceiver module.

Embodiments provide a further method for a wireless communication device. The method comprises communicating with a further wireless communication device via a transceiver module using a first connection, the first connection being based on a long range communication mode of the transceiver module. The method comprises transmitting a short range advertisement packet using a short range communication mode of the transceiver module. The method comprises receiving an indication that the further wireless communication device has successfully received the short range advertisement packet. The method comprises controlling the transceiver module to switch to a short range communication mode of the transceiver module for communicating with the further wireless communication device after receiving the indication. The method comprises communicating with the further wireless communication device using a second connection. The second connection is based on the short range communication mode of the transceiver module.

Embodiments of the present disclosure further provide a computer program having a program code for performing at least one of the above methods, when the computer program is executed on a computer, a processor, or a programmable hardware component. For example, the computer program may be configured to control the respective transceiver module(s).

BRIEF DESCRIPTION OF THE FIGURES

Some examples of apparatuses and/or methods will be described in the following by way of example only, and with reference to the accompanying figures, in which

FIG. 3 shows a schematic diagram of packets being exchanged by two wireless communication devices.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1A:
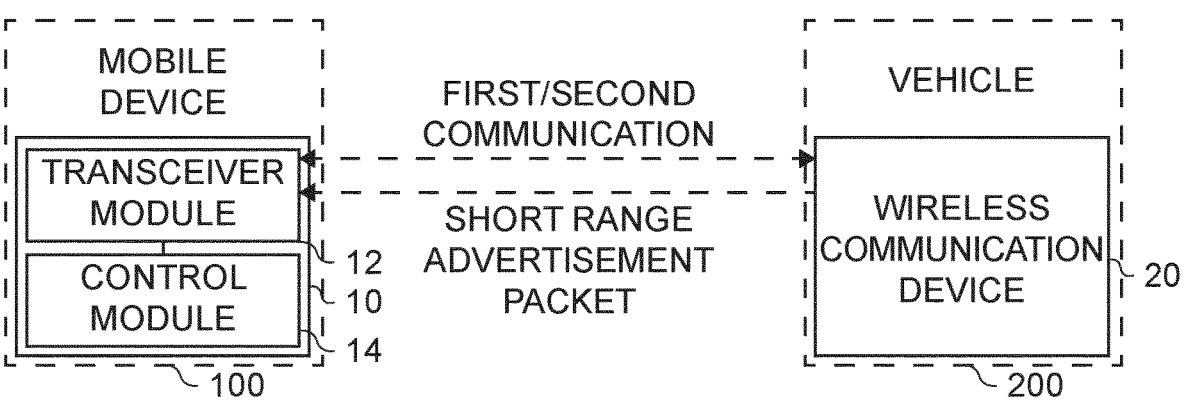
FIG. 1a shows a block diagram of an embodiment of a wireless communication device.
Figure 2A:
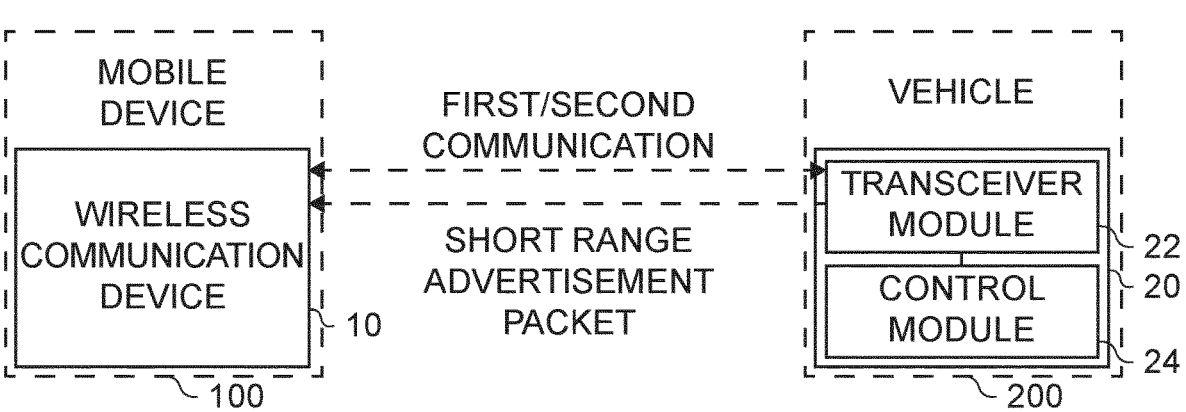
FIG. 2a shows a block diagram of a further embodiment of a wireless communication device.

FIG. 1a shows a block diagram of an embodiment of a wireless communication device 10. The wireless communication device 10 comprises a transceiver module 12 for communicating with a further wireless communication device 20. The wireless communication device 10 further comprises a control module 14 that is coupled to the transceiver module 12. The control module 14 is configured to communicate with the further wireless communication 20 device using a first connection. The first connection is based on a long range communication mode of the transceiver module 12. The control module 14 is configured to receive a short range advertisement packet from the further wireless communication device 20 via the transceiver module 12. The control module 14 is configured to control the transceiver module 12 to switch to a short range communication mode of the transceiver module for communicating with the further wireless communication device 20 after receiving the short range advertisement packet. The control module 14 is configured to communicate with the further wireless communication device 20 using a second connection. The second connection is based on the short range communication mode of the transceiver module 12. FIG. 1a further shows a mobile device 100 comprising the wireless communication device 10. In FIGS. 1a and 2a, the wireless communication device 10 is part of the mobile device 100 and the further wireless communication device 20 is part of a vehicle 200. It should be evident to the person skilled in the art that the roles can be reversed, e.g. that the wireless communication device 10 is comprised by the vehicle 200 and the further wireless communication device is comprised by the mobile device 100. Whatever the distribution, FIG. 1a further shows a system comprising both the mobile device 100 and the vehicle 200.

Figure 1B:
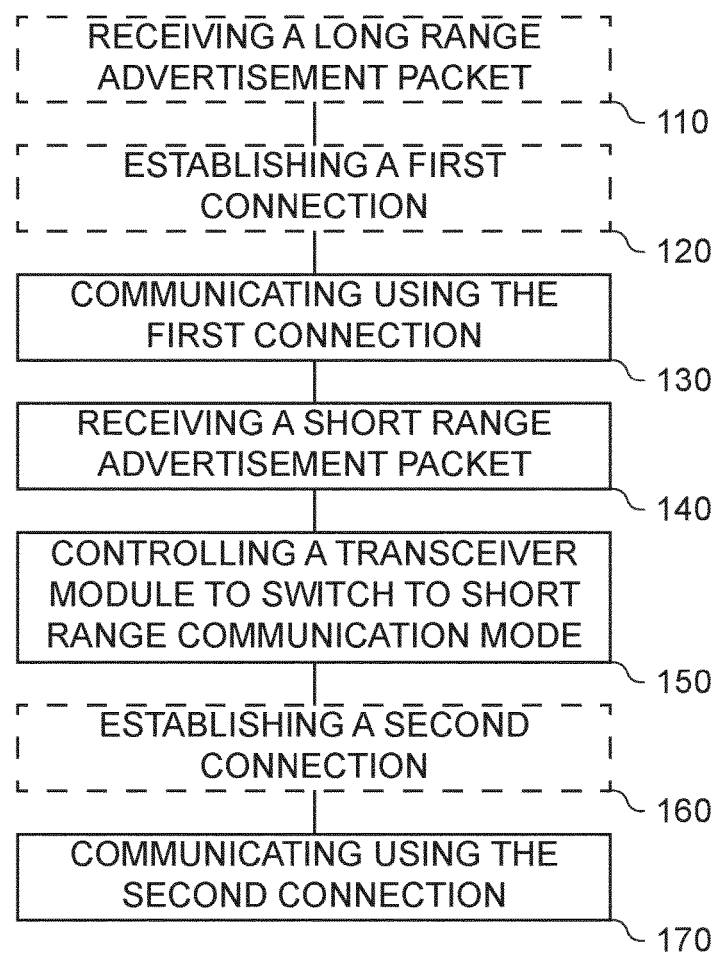
FIG. 1b shows a flow chart of an embodiment of a method for a wireless communication device.

FIG. 1b shows a flow chart of an embodiment of a corresponding method for the wireless communication device 10. The method comprises communicating 130 with the further wireless communication device 20 via the transceiver module 12 using the first connection. The method comprises receiving 140 the short range advertisement packet from the further wireless communication device 20 via the transceiver module 12. The method comprises controlling 150 the transceiver module 12 to switch to a short range communication mode of the transceiver module 12 for communicating with the further wireless communication device 20 after receiving the short range advertisement packet. The method comprises communicating 170 with the further wireless communication device 20 using the second connection. For example, the method may be executed by the wireless communication device 10. Additional features of the wireless communication device 10 may therefore provide additional features for the corresponding method.

The following description relates to both the wireless communication device 10 of FIG. 1a and to the corresponding method of FIG. 1b.

At least some embodiments relate to a wireless communication device and to a corresponding method and computer program. In general, the wireless communication device 10, and/or the further wireless communication device 20, may be wireless communication devices that are used by other devices, e.g. communication chipsets that are used by a mobile device or a vehicle to communicate via a wireless communication protocol, such as Bluetooth. For example, the wireless communication device 10, and/or the further wireless communication device 20, may be Bluetooth (LE) chipsets. In some embodiments, the wireless communication device 10, and/or the further wireless communication device 20, may be part of a wireless communication chipset, e.g. a combined WiFi/Bluetooth chipset.

In some wireless communication systems, such as in wireless communication via Bluetooth, communication is initiated via so-called "advertisement packets", which are packets which are (usually periodically) transmitted by a wireless communication device that wishes to be perceived by other wireless communication devices in its vicinity. When one of the other wireless communication devices receives such an advertisement packet, it may choose to establish (i.e. to initiate) a connection to the wireless communication device that has transmitted the advertisement packet. In the nomenclature of wireless communication, the wireless communication device may be denoted as "advertiser" wireless communication device and the other wireless communication device that initiates the connection as "initiator" wireless communication device of the connection. In Bluetooth, the initiator wireless communication device is denoted as "master" wireless communication device, and the advertiser wireless communication device as "slave" wireless communication device.

This principle also applies here. With respect to the second connection, the further wireless communication device 20 is the advertiser wireless communication device

7

(as the long range advertisement packet is transmitted by the further wireless communication device 20), and the wireless communication device 10 is the initiator wireless communication device.

With respect to the first connection, the roles may be the same. In this case, the control module 14 may be configured to receive 110 a long range advertisement packet from the further wireless communication device 20 via the transceiver module 12, and to establish 120 the first connection after (i.e. in response to) receiving the long range advertisement packet from the further wireless communication device 20. For example, the first connection may be established by transmitting a connection request (CONNECT_REQ in Bluetooth LE) packet to the further wireless communication device 20, using the long range communication mode and/or using a device identifier of the wireless communication device as destination address. Alternatively, with respect to the first connection, the wireless communication device may be the advertiser wireless communication device and the further wireless communication device may be the initiator wireless communication device. In this case, the control module 14 may be configured to transmit (e.g. to periodically transmit) a long range advertisement packet to the further wireless communication device 20 via the transceiver module 12, and to establish the first connection after receiving an indication that the further wireless communication device 20 has successfully received the long range advertisement packet. In any case, the further wireless communication device is the counterpart of the wireless communication device 10, i.e. for each of the connections of the wireless communication devices is initiator (or master), and the other is advertiser (or slave).

As is evident from the previous example, both wireless communication device may be configured to transmit and/or receive long range and/or short range advertisement packets. In other words, the transceiver module 12 may be configured to transmit and/or listen for short range advertisement packets and long range advertisement packets. For example, advertisement packets of the long range communication mode may be distinguished from advertisement packets of the short range communication mode at least based on a preamble of the advertisement packets. For example, the long range advertisement packet may comprise a preamble that is longer than the preamble of the short range advertisement packet. In this context, a long range advertisement packet may be an advertisement packet that is suitable for advertising a capability and/or availability of a wireless communication device that has transmitted the long range advertisement packet to initiate a connection via a long range communication mode of the wireless communication system. A short range advertisement packet may be an advertisement packet that is suitable for advertising a capability and/or availability of a wireless communication device that has transmitted the short range advertisement packet to initiate a connection via a short range communication mode of the wireless communication system. Both types of advertisement packets may comprise a device identifier of the wireless communication device that has transmitted the advertisement packet, i.e. a unique identifier that may be used to uniquely identify the wireless communication device that has transmitted the advertisement packet. This device identifier may be used by the initiator wireless communication device to establish the connection.

As indicated above, the transceiver module 12 may be configured to transmit and/or listen for short range advertisement packets and long range advertisement packets. To avoid the need for a transceiver module that is suitable for listening for, and transmitting in, two or more frequency bands, both the long range communication mode and the short range communication mode may use the same frequency band. For example, both the long range communication mode and the short range communication mode may use the 2.4 GHz frequency band, i.e. the frequency band between 2.4 GHz and 2.5 GHz. This frequency band is a popular frequency band, as it is open for unlicensed communication between low-power wireless devices. Originally designated for ISM (Industrial, Scientific and Medical) purposes, it is now mostly known for the use in local wireless communication systems, such as Bluetooth (LE), WiFi, Zigbee, baby phones etc. Alternatively, the long range communication mode and the short range communication mode may use different (non-overlapping) frequency bands.

In general, the long range communication may provide (reliable) communication over longer ranges, albeit, usually, at a lower transmission rate. In other words, the long range communication mode may provide a reliable communication up to a first distance (i.e. having a bit error rate below a threshold), and short range communication may provide a reliable communication up to a second distance, the second distance being lower than the first distance. A maximal bit transmission rate of the long range transmission mode may be lower than a maximal bit transmission rate of the short range transmission mode. When used in the same frequency band, the long range communication mode may be achieved by using a less complex modulation scheme, e.g. by using Quadrature amplitude modulation (QAM) 64 instead of QAM 256 for radio transmissions (Gaussian frequency-shift keying is used for Bluetooth LE). Alternatively or additionally, a different number of symbols may be used for the transmission of a single bit. For example, the long range communication mode may use a higher number of symbols for each transmitted bit than the short range communication mode. For example, if the long rage communication mode and the short range communication mode are based on Bluetooth LE, the short range communication mode may use one symbol per transmitted bit, and the long range communication mode may use two (or eight) symbols per transmitted bit. In other words, the number of symbols used for the transmission of a bit may be at least twice as high in the long range communication mode as in the long range communication mode. By using a higher number of symbols, a bit error rate may be reduced, as the transceiver module on the receiving side has more symbols to derive the transmitted bit from. For example, many transmission errors result from short pulses of interference, which might affect only a single symbol. By having two symbols per bit, the error may be recognized, by having more symbols, it may even be corrected. For example, in the coded transmission mode of Bluetooth LE, up to 8 symbols can be used for transmitting a single bit, enabling a forward error correction that enables transmissions over long distances.

As laid out above, at least some embodiments of the present disclosure relate to Bluetooth communications, more precisely Bluetooth Low Energy communications starting from Bluetooth specification 5.0. In other words, the transceiver module 12 may be configured to communicate with the further wireless communication device 20 using a Bluetooth communication protocol, e.g. Bluetooth LE or Bluetooth LE version 5.0 and later. In the Bluetooth 5.0 specification, a long range communication mode was added to the Bluetooth LE standard, a so-called "coded" communication mode. The term "coded" was chosen, as the bits transmitted in this communication mode are represented by two or eight symbols, such that a code is added on top of the existing symbols. This communication mode is implemented by two physical layer implementations that are denoted LE coded S=2 (two symbols per bit, having a maximal transmission rate of 512 kilobit/s) and LE coded S=8 (eight symbols per bit, having a maximal transmission rate of 128 kilobit/s). The short range communication mode, denoted "uncoded" communication mode, is implemented by two other physical layer implementations, LE 1M (having a maximal transmission bit rate of 1 Megabit/s) and LE 2M (having a maximal transmission bit rate of 2 Megabit/s). In some embodiments, the long range communication mode may be a coded communication mode of the Bluetooth (LE) communication protocol and the short range communication mode may be an uncoded communication mode of the Bluetooth (LE) communication protocol. Alternatively, the long range communication may be a coded communication mode of the Bluetooth (LE) communication protocol using the LE coded S=8 physical layer implementation, and the short range communication mode may be a coded communication mode of the Bluetooth (LE) communication protocol using the LE coded S=2 physical layer implementation. In other words, the transceiver module 12 may be configured to use a short range physical layer implementation for the short range communication mode and a long range physical layer implementation for the long range communication mode. In the first example, the long range physical layer implementation may be one of the LE S=2 and LE S=8 physical layer implementations, and the short range physical layer implementation may be one of the LE 1M and LE 2M physical layer implementations. In the second example, the long range physical layer implementation may be the LE S=8 physical layer implementation and the short range physical layer implementation may be the LE S=2 physical layer implementation.

The control module is configured to communicate with the further wireless communication 20 device using the first connection, the first connection being based on a long range communication mode of the transceiver module 12. In other words, packets transmitted over the first connection are transmitted using the long range communication mode of the transceiver module 12. Similarly, packets transmitted over the second connection are transmitted using the short range communication mode of the transceiver module 12. In general, in wireless communication systems, connections are logical constructs that are used to logically bundle wirelessly transmitted packets between two wireless communication devices. In embodiments, both the first and the second connection may be logical connections that may be used to transmit both control data and payload data between the wireless communication device 10 and the further wireless communication device 20. For example, the first connection and/or the second connection may be connections as defined in the Bluetooth LE specification.

The control module is configured to receive a short range advertisement packet from the further wireless communication device 20 via the transceiver module 12. This short range advertisement packet may be received by the wireless communication device while the first connection between the wireless communication device 10 and the further wireless communication device 20 is established. The short range advertisement packet may be separate from the first connection. In at least some embodiments, the short range advertisement packet may be received using a short range communication mode of the transceiver module 12.

In at least some embodiments, the wireless communication device may associate the short range advertisement packet with the further wireless communication device, in order to recognize that both the first connection and the short range advertisement packet are linked to the further wireless communication device 20. For this, the device identifier comprised in the short range advertisement packet may be used. In other words, the control module 14 may be configured to identify the short range advertisement packet as originating from the further wireless communication module based on a device identifier comprised in the short range advertisement packet. In some embodiments, the device identifier may be a permanent (e.g. non-obfuscated) device identifier of the further wireless communication device 20. Alternatively, the device identifier may be a temporary (e.g. obfuscated) device identifier of the further wireless communication device used (only) for advertisement packets. In this case, the control module 14 may be configured to receive the (temporary) device identifier from the further wireless communication device 20 via the first connection. A corresponding control module 24 of the further wireless communication device may be configured to transmit the (temporary) device identifier via the first connection.

The control module 14 is configured to control the transceiver module 12 to switch to the short range communication mode of the transceiver module for communicating with the further wireless communication device 20 after (e.g. in response to) receiving the short range advertisement packet. As noted above, in some wireless communication systems, such as Bluetooth LE, different physical layer implementations may be used for the different communication modes. Accordingly, the control module 14 may be configured to control the transceiver module 12 to switch to the short range physical layer implementation after receiving the short range advertisement packet. Alternatively or additionally, a modulation scheme and/or a number of symbols used for a transmission of a bit may be adjusted in the switch to the short range communication mode of the transceiver module.

In at least some embodiments, the switch over to the short range communication mode may be conditional on the transmission quality of the received short range advertisement packet. In general, even short range advertisement packets may be received hundreds of meters away, albeit at a low signal strength and a high bit error rate. Reliable communication via the short range communication mode may be possible at much smaller distances, e.g. at distances of less than 50 (or less than 25 meters). Communicating via the short range communication mode may become feasible as the wireless communication device is getting closer to the further wireless communication device. Accordingly, the control module may be configured to evaluate the short range advertisement packet, to determine whether short range communication is deemed feasible. If it is not deemed feasible, the short range advertisement packet may be discarded, and the communication via the first connection may be continued. In other words, the control module 14 may be configured to control the transceiver module 12 to switch to the short range communication mode of the transceiver module 12 for communicating with the further wireless communication device 20 if a signal strength of the received short range advertisement packet is above a signal strength threshold or if a bit error rate estimated based on the received short range advertisement packet is below a bit error rate threshold. For example, the signal strength may be a Received Signal Strength Indicator (RSSI), and is an indicator of a received power (of the short range advertisement packet) as received at an antenna of the transceiver module. The bit error rate estimated based on the received short range advertisement packet may be a bit error rate that is likely to occur on the second communication (if it were established). The control module 14 may be configured to estimate the bit error rate based on the signal strength, based on a noise level (i.e. based on a Signal-to-Noise-Ratio, SNR, of the short range advertisement packet), and/or based on an effect of multi-path propagation observable within the received short range advertisement packet.

The control module 14 is configured to communicate with the further wireless communication device 20 using the second connection, the second connection being based on the short range communication mode of the transceiver module 12. In at least some embodiments, the control module 14 may be configured to establish 160 the second connection via the transceiver module 12 after receiving the short range advertisement packet. For example, the second connection may be established by transmitting a connection request (CONNECT_REQ in Bluetooth LE) packet to the further wireless communication device 20, using the short range communication mode and/or using a device identifier of the wireless communication device as destination address. Alternatively, the connection request may be transmitted via the first connection, or a different request, e.g. a switch over request may be transmitted via the first connection. By establishing the second connection, the wireless communication device may indicate successful receipt of the short range advertisement packet to the further wireless communication device 10.

Alternatively, the establishment of the second connection may be initiated by the further wireless communication device 200. In this case, the control module may be configured to transmit an acknowledgement packet to the further wireless communication device via the first connection, the acknowledgement packet indicating the successful receipt of the short range advertisement packet to the further wireless communication device 10. After transmitting the acknowledgement packet, a connection request may be received from the wireless communication device, and the second connection may be established based on the connection request received from the further wireless communication device. In other words, the control module 14 may be configured to transmit an acknowledgement packet to the further wireless communication device 20 in response to the short range advertisement packet, e.g. before switching to the short range communication mode. The control module 14 may be configured to receive a connection request from the further wireless communication device, e.g. via the first connection or via the short range communication mode, and to establish the second connection based on the received connection request.

The control module 14 may be configured to use the second connection for communicating with the further wireless communication device 20 after establishing the second connection. For example, the control module 14 may be configured to (seamlessly) continue the communication initially performed over the first connection using the second connection. For example, packet numbers used on the first connection may be carried on in the second connection. The control module 14 may be configured to route the communication between the wireless communication device 14 over the first connection if (only) the first connection is available, and via the second connection if the second connection is available.

In some embodiments, the first connection may be terminated after the second connection is established. For example, the control module 14 may be configured to terminate the first connection after the second connection is established. Alternatively, it may be useful to maintain the first connection, e.g. to have a fallback option in case a reliability of the second connection is not good enough. Accordingly, the control module 14 may be configured to maintain the first connection after the second connection is established. The control module 14 may be configured to revert to using the first connection if the second connection fails (e.g. is terminated).

The transceiver module 12 (and/or a transceiver module 22 shown in connection with the wireless communication device of FIG. 2a) may be implemented as any means for transceiving, i.e. receiving and/or transmitting etc., one or more transceiver units, one or more transceiver devices and it may comprise typical receiver and/or transmitter components, such as one or more elements of the group of one or more Low-Noise Amplifiers (LNAs), one or more Power Amplifiers (PAs), one or more filters or filter circuitry, one or more diplexers, one or more duplexers, one or more Analog-to-Digital converters (A/D), one or more Digital-to-Analog converters (D/A), one or more modulators or demodulators, one or more mixers, one or more antennas, etc.

In embodiments the control module 14 (and/or a control module 24 shown in connection with the wireless communication device of FIG. 2a) may be implemented using one or more processing units, one or more processing devices, any means for processing, such as a processor, a computer or a programmable hardware component being operable with accordingly adapted software. In other words, the described function of the control module 14; 24 may as well be implemented in software, which is then executed on one or more programmable hardware components. Such hardware components may comprise a general purpose processor, a Digital Signal Processor (DSP), a micro-controller, etc.

For example, the vehicle 200 may be a land vehicle, a road vehicle, a car, an automobile, an off-road vehicle, a motor vehicle, a truck or a lorry. The mobile device may be a mobile phone, such as a smartphone, a tablet computer or a wearable device, such as a smart watch or a fitness band.

More details and aspects of the wireless communication device 10/20 are mentioned in connection with the proposed concept or one or more examples described above or below (e.g. FIGS. 2a to 3). The wireless communication device 10/20 may comprise one or more additional optional features corresponding to one or more aspects of the proposed concept or one or more examples described above or below.

FIG. 2a shows a block diagram of a further embodiment of a wireless communication device 20. For example, the wireless communication device 20 may be the further wireless communication device 20 introduced in connection with FIG. 1a. In many regards, the wireless communication device 20 may be implemented similar to the wireless communication device 10 of FIG. 1a. The wireless communication device 20 comprises a transceiver module 22 for communicating with a further wireless communication device 10 (i.e. the wireless communication device 10 of FIG. 1a). The wireless communication device 20 comprises a control module 24 that is coupled to the transceiver module 22. The control module 24 is configured to communicate with the further wireless communication device 10 using a first connection. The first connection is based on a long range communication mode of the transceiver module 22. The control module 24 is configured to transmit a short range advertisement packet using a short range communication mode of the transceiver module 22. The control module 24 is configured to receive an indication that the further wireless communication device 10 has successfully received the short range advertisement packet. The control module 24 is configured to control the transceiver module 22 to switch to a short range communication mode of the transceiver module 22 for communicating with the further wireless communication device 10 after receiving the indication. The control module 24 is configured to communicate with the further wireless communication device 10 using a second connection. The second connection is based on the short range communication mode of the transceiver module 22. FIG. 2a further shows a vehicle 200 comprising the wireless communication device 20. In FIGS. 1a and 2a, the further wireless communication device 10 is part of the mobile device 100 and the wireless communication device 20 is part of a vehicle 200. It should be evident to the person skilled in the art that the roles can be reversed, e.g. that the further wireless communication device 10 is comprised by the vehicle 200 and the wireless communication device 20 is comprised by the mobile device 100. FIG. 2a further shows a system comprising the vehicle 200 and the mobile device 100.

Figure 2B:
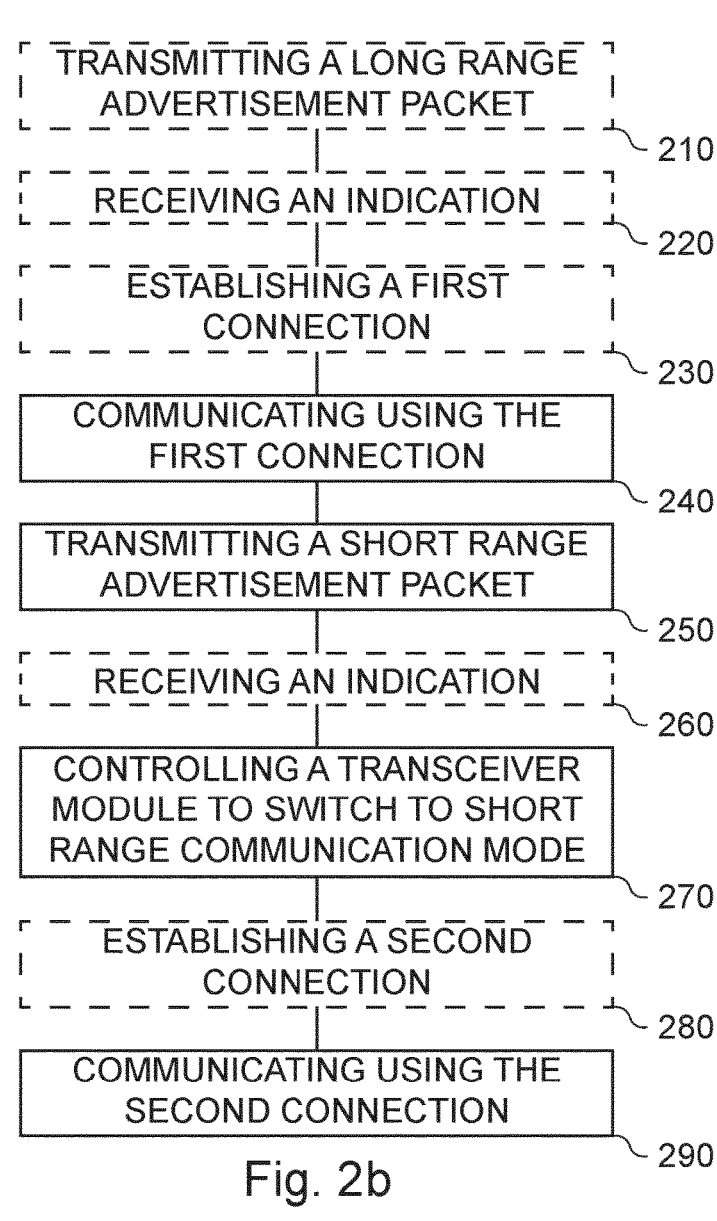
FIG. 2b shows a flow chart of a further embodiment of a method for a wireless communication device.

FIG. 2b shows a flow chart of a corresponding method for the wireless communication device 20. The method comprises communicating 240 with the further wireless communication device 10 via the transceiver module 22 using a first connection. The method comprises transmitting 250 the short range advertisement packet using the short range communication mode of the transceiver module 22. The method comprises receiving 260 the indication that the further wireless communication device 10 has successfully received the short range advertisement packet. The method comprises controlling 270 the transceiver module to switch to the short range communication mode of the transceiver module for communicating with the further wireless communication device 10 after receiving the indication. The method comprises communicating 290 with the further wireless communication device using the second connection. For example, the method may be executed by the wireless communication device 20 of FIG. 2a. Additional features of the wireless communication device 20 may therefore provide additional features for the corresponding method.

The following description relates to both the wireless communication device 20 of FIG. 2a and to the corresponding method of FIG. 2b.

As indicated in connection with FIGS. 1a and/or 1b, the wireless communication device 20 of FIG. 2a may be seen as counterpoint to the wireless communication device 10 of FIG. 1a. For example, with respect to the second connection, the wireless communication device 20 is the advertiser wireless communication device (as the long range advertisement packet is transmitted by the wireless communication device 20), and the further wireless communication device 10 is the initiator wireless communication device. With respect to the first connection, the roles may be the same. In this case, the control module 24 may be configured to transmit 210 (e.g. to periodically transmit) a long range advertisement packet to the further wireless communication device 10 via the transceiver module 22, and to establish 230 the first connection after receiving 220 an indication that the further wireless communication device 10 has successfully received the long range advertisement packet. Alternatively, with respect to the first connection, the further wireless communication device 10 may be the advertiser wireless communication device and the wireless communication device 20 may be the initiator wireless communication device. In this case, the control module 24 may be configured to receive a long range advertisement packet from the further wireless communication device 10 via the transceiver module 22, and to establish 230 the first connection after (i.e. in response to) receiving the long range advertisement packet from the further wireless communication device 10. For example, the first connection may be established by transmitting a connection request (CONNECT_REQ in Bluetooth LE) packet to the further wireless communication device 10, using the long range communication mode and/or using a device identifier of the wireless communication device as destination address. In any case, the further wireless communication device is the counterpart of the wireless communication device 20, i.e. for each of the connections of the wireless communication devices is initiator (or master), and the other is advertiser (or slave).

The control module 24 is configured to transmit the short range advertisement packet using a short range communication mode of the transceiver module 22. For example, the control module 24 may be configured to periodically transmit the short range advertisement packet.

The control module 24 may be configured to transmit (and/or listen for) (both) short range advertisement packets and long range advertisement packets. The short range advertisement packet may be transmitted while the first connection is established.

The control module 24 is configured to receive an indication that the further wireless communication device 10 has successfully received the short range advertisement packet. For example, the indication may be a connection request e.g. (CONNECT_REQ in Bluetooth LE) by the further wireless communication device 10. Alternatively, the indication may be a different request by the further wireless communication device 10, e.g. a switch over request that is received via the first connection, or an acknowledgement packet transmitted by the further wireless communication device in response to the short range advertisement packet. The indication may be received via the short range communication mode of the transceiver module 24, or via the first connection 22 (and therefore the long range communication mode). The control module 24 is configured to control the transceiver module 22 to switch to a short range communication mode of the transceiver module 22 for communicating with the further wireless communication device 10 after receiving the indication.

In some cases, the establishment of the second connection may be initiated by the further wireless communication device, e.g. if a connection request or a switch mode request is received from the further wireless communication device 10. Accordingly, the control module 24 may be configured to establish the second connection after (i.e. in response to) receiving the indication, e.g. after (i.e. in response to) receiving the connection request or switch request. Alternatively, the establishment of the second connection may be initiated by the wireless communication device 20. Accordingly, the control module 24 may be configured to transmit a connection request to the further wireless communication device 10 after (i.e. in response to) receiving the acknowledgement packet, and to establish the second connection after transmitting the connection request.

More details and aspects of the wireless communication device 10/20 are mentioned in connection with the proposed concept or one or more examples described above or below (e.g. FIG. 1a to 1b, 3). The wireless communication device 10/20 may comprise one or more additional optional features corresponding to one or more aspects of the proposed concept or one or more examples described above or below.

FIG. 3 shows a schematic diagram of packets being exchanged by two wireless communication devices 10 and 20 of FIGS. 1a and 1b according to an embodiment. FIG. 3 shows only an exemplary flow of packets—other implementations are possible. In the example of FIG. 3, long and short range advertisement packets are transmitted 310 by both the wireless communication device 10 and the wireless communication device 20. At reference sign 320, a long range advertisement packet is transmitted by wireless communication device 20 and received by wireless communication device 10. In response to the long range advertisement packet, at reference sign 330, an indication, such as a connection request, is transmitted by wireless communication device 10 and received by wireless communication device 20. The first connection is established 340, and the wireless communication device communicate using the first connection. At reference sign 350, while the first connection is established, wireless communication device 10 receives a short range advertisement packet transmitted by wireless communication device 20. In response, at reference sign 360, wireless communication device 10 transmits an indication to wireless communication device 20. Both wireless communication devices switch to the short range communication mode 370; 380. In the case of wireless communication device 10, switching to the short rang communication mode 370 may occur before or after transmitting 360 the indication. Finally, at reference sign 390, the second connection is established and wireless communication devices 10; 20 communicate using the second connection.

More details and aspects of the schematic diagram are mentioned in connection with the proposed concept or one or more examples described above or below (e.g. FIG. 1a to 2b). The schematic diagram may comprise one or more additional optional features corresponding to one or more aspects of the proposed concept or one or more examples described above or below.

Embodiments may provide a reliable method to switch between long range and normal mode for Bluetooth LE communication.

The usage of Bluetooth low energy (BLE) has been dramatically increased in recent years. In the automotive domain, BLE is quite promising for different applications (e.g., keyless car access). For example, BLE may be used for keyless car access. In such scenarios, the coverage of BLE should be high enough in order to guarantee good function quality. In the Bluetooth version 5.0, a feature called long range is introduced in order to increase the coverage of BLE systems. The drawback of the long range modes may be that they lead to a low data rate which affect the speed of the data communication. Therefore, the long range feature may be used at first, however high data rate may be used when approaching the car. Embodiments of the present disclosure may be used to switch between different modes.

The Bluetooth standard lacks a method to switch to normal mode when approaching the peered device, e.g. when the user gets into the coverage of the normal mode. Based on the Bluetooth standard, it might not be possible to detect when the user enters the coverage of the normal mode. A change to normal mode at a pre-defined distance could lead to the loss of connection.

In BLE, a peered device may be configured to scan for low power mode packets in order to check if the device is known. In at least some embodiments, the peripheral device may advertise for both normal mode and long range mode (e.g. short range communication mode and long range communication mode). When the user approaches the peered device, the long range advertisement may be detected and the connection (e.g. the first connection) may be established with long range mode (low data rate). When the user approaches the peered device, the normal mode advertisement may be detected at certain distance, in this case the connection could be switched to normal mode (e.g. the second connection) without the risk to lose the connection.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F) PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

LIST OF REFERENCE SIGNS

10 Wireless communication device
12 Transceiver module
14 Control module
20 Wireless communication device
22 Transceiver module
24 Control module
100 Mobile device
110 Receiving a long range advertisement packet
120 Establishing a first connection
130 Communicating using the first connection
140 Receiving a short range advertisement packet
150 Controlling a transceiver module to switch to a short range communication mode
160 Establishing a second connection
170 Communicating using the second connection
200 Vehicle
210 Transmitting a long range advertisement packet
220 Receiving an indication
230 Establishing a first connection
240 Communicating using the first connection
250 Transmitting a short range advertisement packet
260 Receiving an indication
270 Controlling a transceiver module to switch to a short range communication mode
280 Establishing the second connection
290 Communicating using the second connection
310 Transmitting long range and short range advertisement packets 320 Transmitting/receiving a long range advertisement packet
330 Transmitting/receiving an indication
340 Establishing a first connection, communicating using the first connection
350 Transmitting/receiving a short range advertisement packet
360 Transmitting/receiving an indication
370 Switching to short range communication mode
380 Switching to short range communication mode
390 Establishing a second connection, communicating using the second connection

What is claimed is:

1. A wireless communication device, comprising:
a transceiver module configured to communicate with a further wireless communication device; and
a control module configured to:
    communicate with the further wireless communication device using a first connection, the first connection being based on a long range communication mode of the transceiver module,
    receive a short range advertisement packet from the further wireless communication device via the transceiver module,
    control the transceiver module to switch to a short range communication mode of the transceiver module for communicating with the further wireless communication device after receiving the short range advertisement packet, and
    communicate with the further wireless communication device using a second connection, the second connection being based on the short range communication mode of the transceiver module;
    wherein the transceiver module is configured to communicate with the further wireless communication device using a Bluetooth communication protocol, and wherein the long range communication mode is a coded communication mode of the Bluetooth communication protocol,
    wherein the control module is configured to maintain the first connection after the second connection is established, and wherein the control module is configured to route communication between the wireless communication device and the further wireless communication device via the first connection if only the first connection is available, and via the second connection if the second connection is available, and
    wherein the control module is configured to seamlessly continue, over the second connection, the communication initially performed over the first connection by carrying over, in the second connection, packet numbers used on the first connection.

2. The wireless communication device according to claim 1, wherein the long range communication mode and the short range communication mode of the transceiver module use the same frequency band, and/or wherein the long range communication mode uses a higher number of symbols for each transmitted bit than the short range communication mode.

3. The wireless communication device according to claim 2, wherein the transceiver module is configured to use a short range physical layer implementation for the short range communication mode and a long range physical layer implementation for the long range communication mode, and wherein the control module is configured to control the transceiver module to switch to the short range physical layer implementation after receiving the short range advertisement packet, wherein the transceiver module is configured to transmit and/or listen for short range advertisement packets and long range advertisement packets.

4. The wireless communication device according to claim 1, wherein the control module is configured to control the transceiver module to switch to the short range communication mode of the transceiver module for communicating with the further wireless communication device if a signal strength of the received short range advertisement packet is above a signal strength threshold or if a bit error rate estimated based on the received short range advertisement packet is below a bit error rate threshold.

5. The wireless communication device according to claim 1, wherein the control module is configured to identify the short range advertisement packet as originating from the further wireless communication module based on a device identifier in the short range advertisement packet.

6. The wireless communication device according to claim 1, wherein the control module is configured to establish the second connection via the transceiver module after receiving the short range advertisement packet, thereby indicating successful receipt of the short range advertisement packet to the further wireless communication device.

7. The wireless communication device according to claim 1, wherein the control module is configured to receive a long range advertisement packet from the further wireless communication device via the transceiver module, and to establish the first connection after receiving the long range advertisement packet from the further wireless communication device.

8. The wireless communication device according to claim 1, wherein the long range communication mode and the short range communication mode of the transceiver module use the same frequency band, and/or wherein the long range communication mode uses a higher number of symbols for each transmitted bit than the short range communication mode.

9. The wireless communication device according to claim 1, wherein the transceiver module is configured to use a short range physical layer implementation for the short range communication mode and a long range physical layer implementation for the long range communication mode, and wherein the control module is configured to control the transceiver module to switch to the short range physical layer implementation after receiving the short range advertisement packet.

10. A mobile device comprising the wireless communication device according to claim 1.

11. A vehicle comprising the wireless communication device according to claim 1.

12. A wireless communication device, comprising:
a transceiver module configured to communicate with a further wireless communication device; and
a control module configured to:
    communicate with the further wireless communication device using a first connection, the first connection being based on a long range communication mode of the transceiver module,
    transmit a short range advertisement packet using a short range communication mode of the transceiver module,
    receive an indication that the further wireless communication device has successfully received the short range advertisement packet,
    control the transceiver module to switch to a short range communication mode of the transceiver module for communicating with the further wireless communication device after receiving the indication, and
    communicate with the further wireless communication device using a second connection, the second connection being based on the short range communication mode of the transceiver module;
    wherein the control module is configured to maintain the first connection after the second connection is established, and wherein the control module is configured to route communication between the wireless communication device and the further wireless communication device via the first connection if only the first connection is available, and via the second connection if the second connection is available, and wherein the control module is configured to seamlessly continue, over the second connection, communication initially performed over the first connection by carrying over in the second connection, packet numbers used on the first connection.

13. A method for use in connection with a wireless communication device, the method comprising:
communicating with a further wireless communication device via a transceiver module using a first connection, the first connection being based on a long range communication mode of the transceiver module;
receiving a short range advertisement packet from the further wireless communication device via the transceiver module;
controlling the transceiver module to switch to a short range communication mode of the transceiver module for communicating with the further wireless communication device after receiving the short range advertisement packet;
communicating with the further wireless communication device using a second connection, the second connection being based on the short range communication mode of the transceiver module, wherein the transceiver module is configured to communicate with the further wireless communication device using a Bluetooth communication protocol, and wherein the long range communication mode is a coded communication mode of the Bluetooth communication protocol;
maintaining the first connection after the second connection is established;
routing communication between the wireless communication device and the further wireless communication device via the first connection if only the first connection is available, and via the second connection if the second connection is available; and
seamlessly continuing, over the second connection, the communication initially performed over the first connection by carrying over, in the second connection, packet numbers used on the first connection.

14. A non-transitory storage medium storing a computer program having a program code for performing the method of claim 13, when the computer program is executed on a computer, a processor, or a programmable hardware component.

15. A method for use in connection with a wireless communication device, the method comprising:
communicating with a further wireless communication device via a transceiver module using a first connection, the first connection being based on a long range communication mode of the transceiver module;

transmitting a short range advertisement packet using a short range communication mode of the transceiver module;

receiving an indication that the further wireless communication device has successfully received the short range advertisement packet;

controlling the transceiver module to switch to a short range communication mode of the transceiver module for communicating with the further wireless communication device after receiving the indication, and communicating with the further wireless communication device using a second connection, the second connection being based on the short range communication mode of the transceiver module;

maintaining the first connection after the second connection is established;

routing communication between the wireless communication device and the further wireless communication device via the first connection if only the first connection is available, and via the second connection if the second connection is available; and seamlessly continuing, over the second connection, communication initially performed over the first connection by carrying over, in the second connection, packet numbers used on the first connection.

16. A non-transitory storage medium storing a computer program having a program code for performing the method of claim 15, when the computer program is executed on a computer, a processor, or a programmable hardware component.

17. A wireless communication device, comprising:

a transceiver module configured to communicate with a further wireless communication device; and a control module configured to:

communicate with the further wireless communication device using a first connection, the first connection being based on a long range communication mode of the transceiver module, receive a short range advertisement packet from the further wireless communication device via the transceiver module, control the transceiver module to switch to a short range communication mode of the transceiver module for communicating with the further wireless communication device after receiving the short range advertisement packet, and communicate with the further wireless communication device using a second connection, the second connection being based on the short range communication mode of the transceiver module;

wherein the control module is further configured to receive the short range advertisement packet from the further wireless communication device via the transceiver module while communicating with the further wireless communication device using the first connection; and wherein the control module is further configured to receive the short range advertisement packet from the further wireless communication device in a first frequency band via the transceiver module while communicating with the further wireless communication device using the first connection, wherein the first connection uses the first frequency band.

* * * * *